US011879338B2

(12) United States Patent
Turner

(10) Patent No.: US 11,879,338 B2
(45) Date of Patent: Jan. 23, 2024

(54) OPPOSED, FREE-PISTON ENGINE

(71) Applicant: KING ABDULLAH UNIVERSITY OF SCIENCE AND TECHNOLOGY, Thuwal (SA)

(72) Inventor: James Turner, Bath (GB)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 0 days.

(21) Appl. No.: 17/795,898

(22) PCT Filed: Jan. 26, 2021

(86) PCT No.: PCT/GB2021/050172
§ 371 (c)(1),
(2) Date: Jul. 28, 2022

(87) PCT Pub. No.: WO2021/152296
PCT Pub. Date: Aug. 5, 2021

(65) Prior Publication Data

US 2023/0098581 A1 Mar. 30, 2023

(30) Foreign Application Priority Data

Jan. 30, 2020 (GB) ..................................... 2001292

(51) Int. Cl.
*F01B 7/02* (2006.01)
*F01B 11/00* (2006.01)
(Continued)

(52) U.S. Cl.
CPC .............. *F01B 7/02* (2013.01); *F01B 11/001* (2013.01); *F02B 33/22* (2013.01); *F02B 75/282* (2013.01)

(58) Field of Classification Search
CPC ................................ F01B 11/001; F01B 7/02
See application file for complete search history.

(56) References Cited

U.S. PATENT DOCUMENTS

| | | | |
|---|---|---|---|
| 3,868,932 | A | 3/1975 | Toth |
| 4,924,956 | A | 5/1990 | Deng et al. |
| 2006/0185631 | A1 | 8/2006 | Fitzgerald |

FOREIGN PATENT DOCUMENTS

| | | | | |
|---|---|---|---|---|
| CN | 107781033 | A | | 3/2018 |
| GB | 760780 | A | * | 11/1956 |

(Continued)

OTHER PUBLICATIONS

International Search Report (Form PCT/ISA/210) for International Application No. PCT/GB2021/050172 dated Apr. 9, 2021.

(Continued)

*Primary Examiner* — Kevin A Lathers
(74) *Attorney, Agent, or Firm* — PATENT PORTFOLIO BUILDERS PLLC

(57) ABSTRACT

An opposed, free-piston engine includes a pair of adjacent cylinders, each extending from a first cylinder end to a second cylinder end along an elongate axis and having a first cylinder housing a first pair of opposed, free pistons including a first piston housed towards the first cylinder end and a second piston housed towards the second cylinder end; a second cylinder housing a second pair of opposed, free pistons having a third piston and a fourth piston; and a pair of link rods including a first link rod and a second link rod. The first link rod has a first link rod end and a second link rod end, the second link rod having a third link rod end and a fourth link rod end.

24 Claims, 17 Drawing Sheets

(51) Int. Cl.

| | |
|---|---|
| ***F02B 33/22*** | (2006.01) |
| ***F02B 75/28*** | (2006.01) |

(56) References Cited

FOREIGN PATENT DOCUMENTS

| | | |
|---|---|---|
| JP | 2008223657 A | 9/2008 |
| JP | 2009008069 A | 1/2009 |

OTHER PUBLICATIONS

Written Opinion of the International Searching Authority (Form PCT/ISA/237) for International Application No. PCT/GB2021/050172 dated Apr. 9, 2021.

* cited by examiner

OPPOSED, FREE-PISTON ENGINE

FIELD OF THE INVENTION

The present invention relates to an opposed, free-piston engine and method.

This application is a U.S. National Stage Application of International Application No. PCT/GB2021/050172, filed on Jan. 26, 2021, which claims priority to United Kingdom Patent Application No. 2001292.8, filed on Jan. 30, 2020, entitled "OPPOSED, FREE-PISTON ENGINE," the disclosures of which are incorporated herein by reference in their entirety.

BACKGROUND

Free-piston engines are known. A free-piston engine is a linear engine where the piston motion is not controlled by a crankshaft but instead is determined by the interaction of forces generated typically by combustion chamber gases, a bounce chamber and a load device such as a turbine or alternator. In an opposed, free-piston engine, each cylinder has a piston both ends and no cylinder head.

Although such engines are useful for generating power, they can be problematic. Accordingly, it is desired to provide an improved opposed free-piston engine.

SUMMARY

According to a first aspect, there is provided an opposed, free-piston engine, comprising: a pair of adjacent cylinders, each extending from a first cylinder end to a second cylinder end along an elongate axis and comprising a first cylinder housing a first pair of opposed, free pistons comprising a first piston housed towards the first cylinder end and a second piston housed towards the second cylinder end; a second cylinder housing a second pair of opposed, free pistons comprising a third piston housed towards the first end cylinder and a fourth piston housed towards the second cylinder end; and a pair of link rods comprising a first link rod and a second link rod, the first link rod having a first link rod end and a second link rod end, the first link rod being coupled towards the first link rod end with the first piston and being coupled towards the second link rod end with the fourth piston, the second link rod having a third link rod end and a fourth link rod end, the second link rod being coupled towards the third link rod end with the second piston and being coupled towards the fourth link rod end with the third piston.

The first aspect recognises that a problem with existing free-piston engines is that their form factor can be problematic since space is required to provide bounce chambers to help reverse the direction of the piston to ensure correct operation. Accordingly, an engine is provided. The engine may be a free-piston engine. The engine may be an opposed, free-piston engine. The engine may comprise two or more cylinders. The number of cylinders may be even. The cylinders may be positioned adjacent each other. Each of the cylinders may extend between a first end and a second end, along an elongate centreline axis. The pair of cylinders may comprise a first cylinder which may house or retain a first pair of pistons. The pistons may be opposed. The first pair of pistons may comprise a first piston and a second piston. The first piston may be located towards the first cylinder end and the second piston may be located towards the second cylinder end. The pair of cylinders may comprise a second cylinder which may house or retain a second pair of pistons.

The pistons may be opposed. The second pair of pistons may comprise a third piston and a fourth piston. The third piston may be located towards the first cylinder end and the fourth piston may be located towards the second cylinder end. The engine may comprise two or more link rods. The link rods may comprise a first link rod and a second link rod. The first link rod may extend between a first link rod end and a second link rod end. The first piston may be coupled with the first link rod proximate the first link rod end. The fourth piston may be coupled with the first link rod proximate the second link rod end. The second link rod may extend between a third link rod end and a fourth link rod end. The second piston may be coupled with the second link rod proximate the third link rod end. The third piston may be coupled with the second link rod proximate the fourth link rod end. In this way, the interconnecting link rods transfer movement of pistons in one cylinder to pistons in the other cylinder. This helps to obviate the need for bounce chambers and provides for a more compact arrangement with fewer parts.

The first cylinder end of the first cylinder may be proximate the first cylinder end of the second cylinder. Accordingly, the first cylinder ends may be located adjacent each other.

The second cylinder end of the first cylinder may be is proximate the second cylinder end of the second cylinder. Accordingly, the second cylinder ends may be located adjacent each other.

The first piston and the second piston may be arranged to reciprocate towards and away from each other within the first cylinder along the elongate axis. Accordingly, the first piston and the second piston may share the same combustion chamber within the first cylinder.

The third piston and the fourth piston may be arranged to reciprocate towards and away from each other within the second cylinder along the elongate axis. Accordingly, the third piston and the fourth piston may share the same combustion chamber within the second cylinder.

Movement of the first piston or the fourth piston along the elongate axis may move the first link rod to move the other of the fourth piston or the first piston along the elongate axis. Hence, movement of the first piston causes a corresponding movement in the fourth piston, and vice-versa. In other words, the first link rod ensures that both the first and fourth pistons move together.

Movement of the second piston or the third piston along the elongate axis may move the second link rod to move the other of the third piston and the second piston along the elongate axis. Hence, movement of the second piston causes a corresponding movement in the third piston, and vice-versa. In other words, the second link rod ensures that both the second and third pistons move together.

Movement of the first piston away from the second piston may cause movement of fourth piston towards the third piston.

Movement of the first piston towards the second piston may cause movement of fourth piston away from the third piston.

Hence, it can be seen that expansion in the first cylinder causes the first piston and the second piston to move apart which causes a consequential compression in the second cylinder due to the third piston and the fourth piston being moved together by the first link rod and the second link rod, and vice-versa.

The first link rod and the second link rod may be rigidly or pivotally coupled with the pistons.

The engine may comprise a pair of power take-offs comprising a first power take-off coupled with the first link rod and a second power take-off coupled with the second link rod. Accordingly, a power take-off may be coupled with each link rod. Furthermore, more than one pair of power take-offs may be provided with more than one coupled with each link rod.

The first power take-off and/or the second power take-off may be positioned towards the first cylinder end and/or the second cylinder end.

The first power take-off and/or the second power take-off may be positioned beyond the first cylinder end and/or the second cylinder end. This provides for an elongate form factor which is convenient in some circumstances. For example, where a low-profile is required.

The first power take-off and/or the second power take-off may be positioned away from the first cylinder and/or the second cylinder along the elongate axis. This also provides for an elongate form factor which is convenient in some circumstances.

The first power take-off and/or the second power take-off may be positioned to at least partially overlie the first cylinder and/or the second cylinder. Arranging for a power take-off to share at least some of the same footprint as the cylinders provides for a compact form factor which is convenient in some circumstances.

The first power take-off may at least partially overlie the first cylinder and the second power take-off may at least partially overlie the second cylinder. Arranging for the power take-offs to share at least some of the same footprint as the cylinders provides for a compact form factor which is convenient in some circumstances.

The pistons may each comprise a piston rod, the power take-offs may each comprise a take-off rod and an elongate axis of the piston rods may be coaxially aligned with an elongate axis of the take-off rods. This arrangement helps to improve balance by aligning the piston rods with the take-off rods.

The first power take-off may be coupled with the piston rod of the first piston or the piston rod of the fourth piston and the second power take-off may be coupled with the piston rod of the second piston or the piston rod of the third piston. This arrangement obviates the need to connect with the link rods since the power take-off elements may instead couple with the piston rods.

The first power take-off may be coupled with the first end of the first link rod or the second end of the first link rod and the second power take-off may be coupled with a third end of the second link rod or the fourth end of the first second rod.

The first power take-off may be coupled at a first position along the first link rod and the second power take-off may be coupled at a second position along the second link rod. This provides for flexibility in the positioning of the power take-offs and flexibility in the overall form factor.

The first position may be intermediate the first end and the second end and the second position may be intermediate the third end and the fourth end.

The first power take-off and second power take-off may be positioned at least partially between the first cylinder and the second cylinder. This helps to retain the power take-offs within the elongate length to provide a compact form factor which is convenient in some circumstances.

The first power take-off and second power take-off may be offset either side of a centreline extending between the first cylinder and the second cylinder, along the elongate axis. This helps to retain the power take-offs within the elongate length to provide a compact form factor which is convenient in some circumstances.

The first power take-off and second power take-off may be coaxially aligned on a centreline extending between the first cylinder and the second cylinder, along the elongate axis. This helps to retain the power take-offs within the elongate length to provide a compact form factor and improves balance which is convenient in some circumstances.

The first power take-off and the second power take-off may be opposed. This helps to improve balance which is convenient in some circumstances.

The power take-off and/or the second power take-off and/or the piston rods may be supported by a respective linear bearing. This helps to reduce side thrust of the pistons within the cylinders, which improves efficiency. The linear bearing may be provided with seals for any pumping and/or bounce chamber.

The engine may comprise at least one further pair of power take-offs coupled with the first and second link rods.

The engine may comprise one or more bounce chambers and/or pumping chambers coupled with one or more of the pistons.

The engine may comprise one or more bounce chambers and/or a pumping chambers coupled with one of more of the link rods.

At least one cylinder and piston may be stepped to provide the at least one of the bounce chamber and the pumping chamber.

The first cylinder and the second cylinder may each comprise one or more inlet ports located towards the first end and one or more outlet ports located towards the second end. The inlet ports may be operable to receive combustion gases and the outlet port may be operable to exhaust combusted gases.

The engine may comprise a first conduit arranged to couple the pumping chamber of either the first cylinder or the second cylinder with the inlet of the other one of the second cylinder and the first cylinder. This helps to provide compresses gases into the cylinder.

The engine may comprise a second conduit arranged to couple the pumping chamber either the first cylinder or the second cylinder with the inlet of the other one of the first cylinder and the second cylinder. This helps to provide compressed gases into the cylinder.

The first cylinder may comprise one or more inlet port located towards the first end and one or more outlet port located towards the second end and the second cylinder may comprise one or more outlet port located towards the first end and one or more inlet port located towards the second end. This means that each link rod only deals with either the inlet or outlet functions which can make control of the top dead centre and bottom dead centre easier.

The first link rod and/or the second link rod may be arranged to present an elongate portion and at least one of the power take-offs may be coupled with the elongate portion.

The first link rod and/or the second link rod may be arranged to present a pair of parallel, counter-reciprocating, elongate portions and one or more of the power take-offs may be coupled with one or more of the pair of parallel, counter-reciprocating, elongate portions.

The pair of parallel, counter-reciprocating, elongate portions may comprise gear racks and each power take-off may comprise a gear driven by motion of a respective one of the gear racks. Hence, the moving teeth on one or more of the gear racks may rotate the gears of the power take-offs.

The pair of parallel, counter-reciprocating, elongate portions may comprise facing gear racks and the at least one of the power take-offs may comprise a gear driven by relative motion of the facing gear racks. Hence, the gear racks may together drive the gear of the power take-off.

The engine may comprise a gear positioner arranged to move a position of the gear with respect to the gear racks. This provides a convenient mechanism to vary the top dead centre and/or bottom dead centre position.

The pair of parallel, counter-reciprocating, elongate portions may comprise one of magnetic and coil components of a linear motor which are arranged to move relative to another of coil and magnetic components of the linear motor. Hence, the magnetic components and coil components may be moved with respect to each other through the movement of the elongate portions. The magnetic components may be located on the elongate portions with the coil portions being statically located, and vice-versa. Likewise, the magnetic components may be located on one elongate portion, with the coil components being located on another elongate portion and typically surrounding or housing the magnetic components—this arrangement increases the relative speed and flux cutting, which in turn increases power take-off. One or more coaxial motors may be provided.

The engine may comprise a controller arranged to control power transfer between the power take-offs and the link rods to vary at least one of cycle timing and compression of the free-piston engine.

The engine may comprise one or more of a 2-stroke, 4-stroke, pump, compressor and expander engine.

According to a second aspect, there is provided a method comprising: providing a pair of adjacent cylinders, each extending from a first cylinder end to a second cylinder end along an elongate axis and comprising a first cylinder housing a first pair of opposed, free pistons comprising a first piston housed towards the first cylinder end and a second piston housed towards the second cylinder end; a second cylinder housing a second pair of opposed, free pistons comprising a third piston housed towards the first end cylinder and a fourth piston housed towards the second cylinder end; and providing a pair of link rods comprising a first link rod and a second link rod, the first link rod having a first link rod end and a second link rod end, the first link rod being coupled towards the first link rod end with the first piston and being coupled towards the second link rod end with the fourth piston, the second link rod having a third link rod end and a fourth link rod end, the second link rod being coupled towards the third link rod end with the second piston and being coupled towards the fourth link rod end with the third piston.

The method may comprise steps corresponding to features of the first aspect mentioned above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing embodiments in any more detail, first an overview will be provided. Embodiments provide an engine assembly. Typically, the engine assembly has a pair of cylinders. Each cylinder in the pair of cylinders has a pair of opposing, free pistons. Each pair of pistons in each cylinder reciprocate together within that cylinder. Accordingly, in this example, four pistons reciprocate in two pairs within the pair of cylinders. A pair of cross-linking rods are provided which couple a piston within one cylinder with a piston in another cylinder. In particular, each cross-linking rod couples a piston in one cylinder with the distal piston in the other cylinder. This means that movement of the pair of pistons in one cylinder away from each other causes movement of the link rods, which causes movement of the pair of pistons in the other cylinder to move towards each other, and vice versa. This helps to synchronize movement between pistons in the cylinders, reduces the requirement for any bounce chambers and provides a mechanism for power take-off from the two cylinders. One or more power take-offs can be coupled to the pistons themselves (typically via piston rods) or from the cross-linkage rods. This arrangement also enables the location of the power take-offs to be selected dependent on the particular form factor required from the engine, improves balance and reduces vibrational issues.

General Arrangement

Figure 1A:
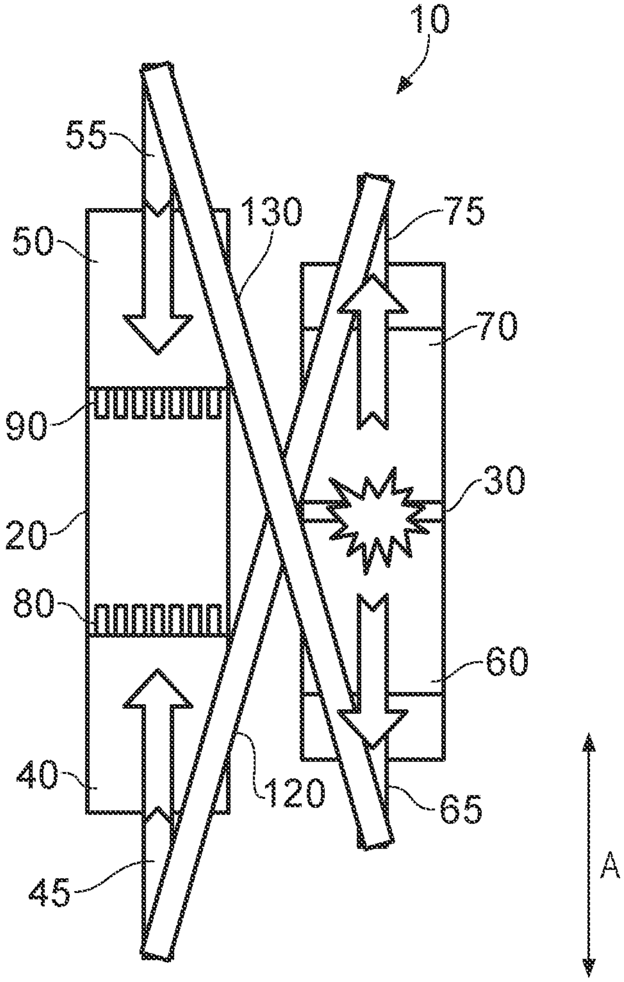
FIG. 1A and FIG. 1B illustrate schematically alternating states of an engine according to one embodiment.
Figure 1B:
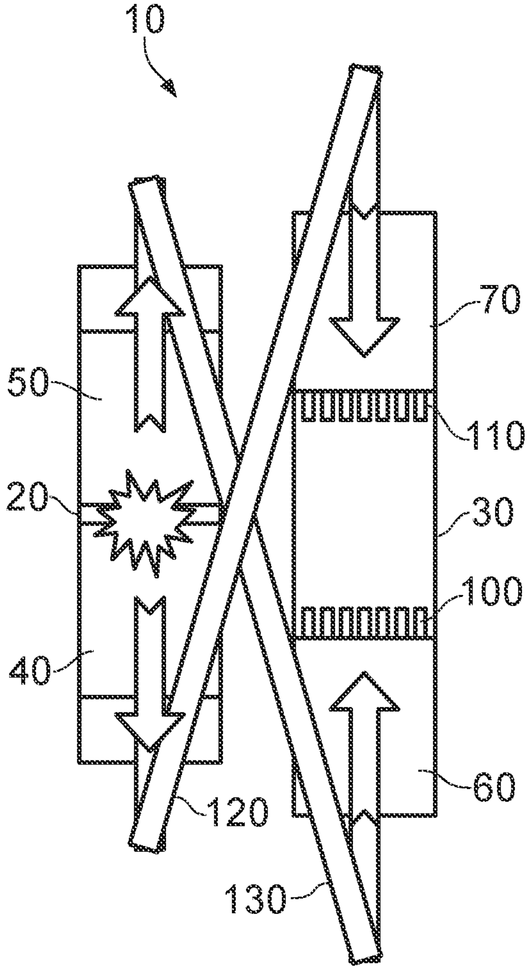

FIG. 1A and FIG. 1B illustrate schematically alternating states of an engine 10 according to one embodiment. The engine 10 comprises a first cylinder 20 and a second cylinder 30. The cylinders 20, 30 extend longitudinally along an elongate axis A. In this example, the longitudinal centreline axes of the first cylinder 20 and the second cylinder 30 are both parallel and extend along the axis A. However, it will be appreciated that the elongate axes of the first cylinder 20 and the second cylinder 30 need not be parallel and may instead diverge.

Located within the first cylinder 20 is a first piston 40 and a second piston 50. Located within the second cylinder 30 is a third piston 60 and a fourth piston 70. In this example, the engine 10 is a two-stroke engine and so a first inlet port band 80 extends circumferentially around the first cylinder 20 proximate the first piston 40, and a first outlet port band 90 extends circumferentially around the first cylinder 20 proximate the second piston 50. Likewise, a second inlet port band 100 extends circumferentially around the second cylinder 30 proximate the third piston 60 and a second outlet port band 110 extends circumferentially around the second cylinder 30 proximate the fourth piston 70. A first piston rod 45 extends from the first piston 40 along the axis A. A second piston rod 55 extends from the second piston 50 along the axis A. A third piston rod 65 extends from the first piston 60 along the axis A. A fourth piston rod 75 extends from the fourth piston 70 along the axis A. Linear bearings (not shown) may be provided to help prevent side movement of the pistons in a direction transverse to the axis A.

A first link rod 120 couples the first piston rod 45 with the fourth piston rod 75. A second link rod 130 couples the second piston rod 55 with the third piston rod 65. The coupling between the link rods 120, 130 and the piston rods 45, 55, 65, 75 may be fixed or pivoting.

In operation, as shown in FIG. 1A, the pair of pistons 40, 50 are at their furthest distance apart (referred hereinafter as "bottom dead centre" using cranked-engine terminology). The movement of the pistons to this position is translated through the link rods 120, 130 and causes the pair of pistons 60, 70 to be at their point of closest approach (referred to hereinafter as "top dead centre" using cranked-engine terminology). Accordingly, fuel drawn in to the second cylinder 30 through the second inlet port band 100 is compressed and ignited. The ignition causes movement of the pair of cylinders 60, 70 away from each other along the axis A to the position shown in FIG. 1B where the pair of cylinders 60, 70 are now at bottom dead centre, which exposes the second outlet port band 110 to enable the combusted gases to escape and exposes the second inlet port band 100 which draws in fresh combustion gases into the second cylinder 30. Movement of the pair of pistons 60, 70 away from each other moves the pair of link rods 120, 130 which, in turn, moves the pair of cylinders 40, 50 to top dead centre where the combustion gases within the first cylinder 20 are combusted as shown in FIG. 1B. This causes movement of the pair of pistons 40, 50 away from each other and a return to the state shown in FIG. 1A. Hence, it can be seen that the engine 10 alternates between the state shown in FIG. 1A and FIG. 1B with work provided by the expansion of combustion gases being transferred from the pistons of one cylinder to the pistons of the other cylinder through the link rods 120, 130. Hence, a reciprocating free-piston engine is provided without the need for any bounce chambers. In other words, combustion in one cylinder directly compresses the fuel and air charge in the other, removing the absolute requirement for a bounce chamber.

Alternative Port Configuration

Figure 2:
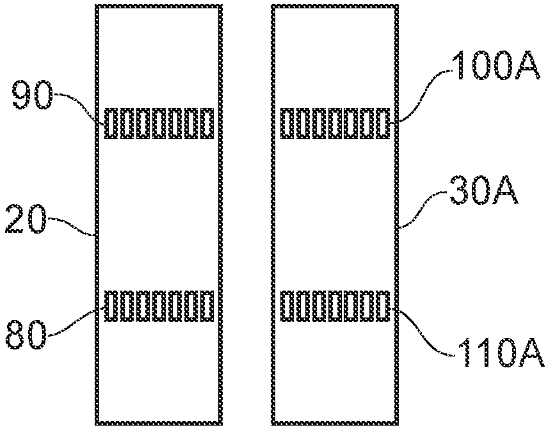
FIG. 2 illustrates schematically an alternate arrangement for the cylinders.

FIG. 2 illustrates schematically an alternate arrangement for the cylinders 20, 30A (all other components have been removed to improve clarity). As can be seen, the position of the second inlet port band 100A and the second outlet port band 110A have been reversed in the second cylinder 30A with respect to the arrangement shown in FIGS. 1A and 1B. This means that the first link rod 120 only deals with combustion gas intake and the second link rod 130 only deals with exhaust. This may help to perform top dead centre and bottom dead centre control more easily via control of the link rods. However, each link rod 120, 130 may also produce a different average power output as the piston phase is changed.

Power Take-Off—1st Arrangement

Figure 3:
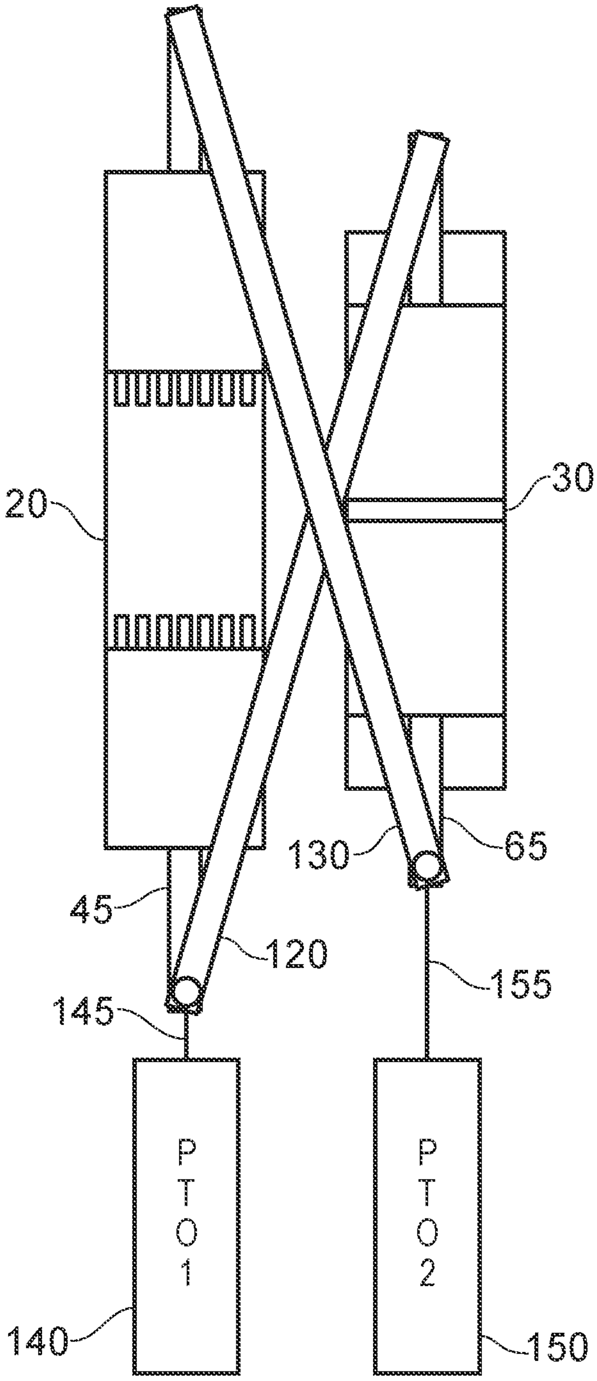
FIGS. 3 to 9 and 10A to 10C illustrate schematically the engine of FIG. 1 to which a pair of power take-offs have been added according to embodiments.

FIG. 3 illustrates schematically the engine of FIG. 1 to which a pair of power take-offs 140, 150 have been added. As can be seen, a first power take-off 140 is coupled with the first link rod 120 and a second power take-off 150 has been coupled with the second link rod 130. The power take-offs 140, 150 may be electric, hydraulic, or pneumatic. In this example, the power take-offs 140, 150 have been coupled with the end portions of the link rods 120, 130, where they couple with the piston rods 45, 65. However, it will be appreciated that the power take-offs 120, 130 may couple instead with the piston rods 45, 65. This arrangement provides an elongate form factor. Also, it can be seen that power take-off rods 145, 155 are coaxially aligned with the piston rods 45, 65. This helps to reduce unbalanced couples. Also, although the power take-offs 140, 150 are coupled with the ends of the link rods 120, 130, it will be appreciated that this need not be the case and that they may be coupled with any portion of the link rods 120, 130 along their length.

In operation, movement of the link rods 120, 130 (and the piston rods 45, 65) causes movement of the power take-off rods 145, 155 which transfers power between the power take-offs 140, 150 and the link rods 120, 130 (and the piston rods 45, 65). The power take-offs 140, 150 are controlled by a controller (not shown) which varies the amount of power transferred between the power take-offs 140, 150 and the link rods 120, 130 (and the piston rods 45, 65) depending on the load on the power take-offs 140, 150 and the cycle position of the pistons in the cylinders 20, 30 to maintain operation of the engine.

Power Take-Off—2nd Arrangement

Figure 4:
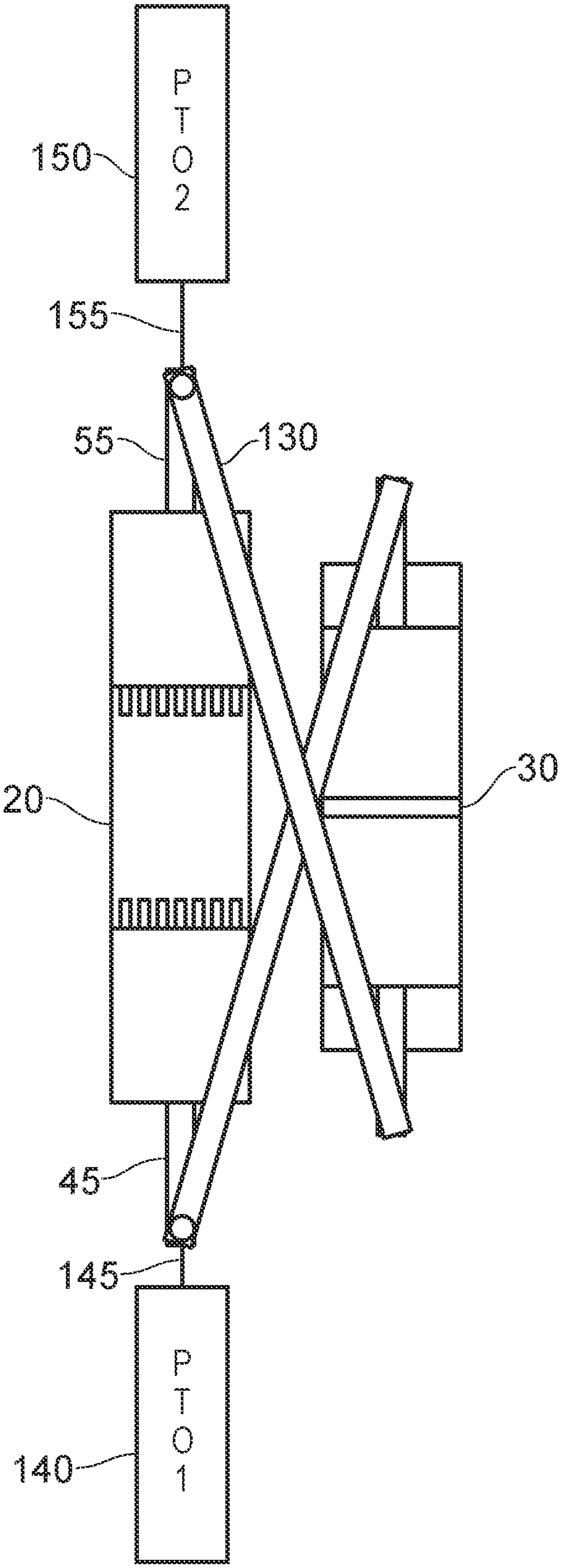

FIG. 4 illustrates schematically another arrangement where the second power take-off 150 is instead arranged opposed to the first power take-off 140 and is instead coupled with the second link rod towards the coupling with the second piston rod 55. Once again, the second power take-off 150 may be coupled with the second piston rod 55 instead. This arrangement also provides an elongate form factor. Also, it can be seen that power take-off rods 145, 155 are coaxially aligned with the piston rods 45, 55. This helps to reduce unbalanced couples. The power take-off rods 145, 155 and the piston rods 45, 55 are coaxially aligned with the second power take-off 150 opposed to the first power take-off 140 which improves balance. Also, although the power take-offs 140, 150 are coupled with the ends of the link rods 120, 130, it will be appreciated that this need not be the case and that they may be coupled with any portion of the link rods 120, 130 along their length.

In operation, movement of the link rods 120, 130 (and the piston rods 45, 55) causes movement of the power take-off rods 145, 155 which transfers power between the power take-offs 140, 150 and the link rods 120, 130 (and the piston rods 45, 55). The power take-offs 140, 150 are controlled by a controller (not shown) which varies the amount of power transferred between the power take-offs 140, 150 and the link rods 120, 130 (and the piston rods 45, 55) depending on the load on the power take-offs 140, 150 and the cycle position of the pistons in the cylinders 20, 30 to maintain operation of the engine.

Power Take-Off—3rd Arrangement

Figure 5:
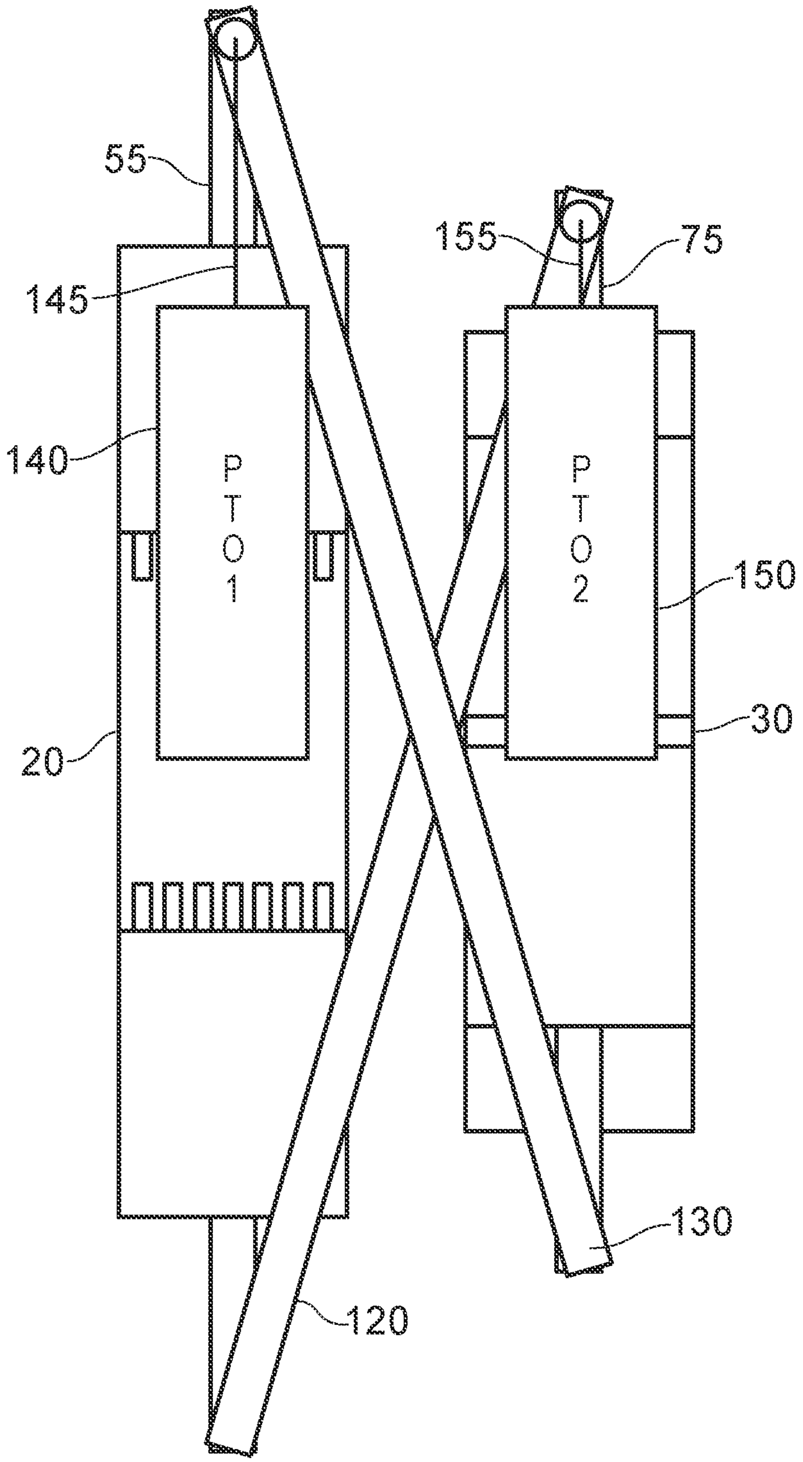

FIG. 5 illustrates schematically an alternative arrangement in which the first power take-off 140 is coupled with either the second link rod 130 or the second piston rod 55, while the second power take-off 150 is coupled with either the first link rod 120 or the fourth piston rod 75. The first power take-off 140 and the second power take-off 150 overlie or are co-located on top of the first cylinder 20 and the second cylinder 30. This arrangement provides a compact form factor. Also, it can be seen that power take-off rods 145, 155 are coaxially aligned with the piston rods 55, 75. This helps to reduce unbalanced couples. Also, although the power take-offs 140, 150 are coupled with the ends of the link rods 120, 130, it will be appreciated that this need not be the case and that they may be coupled with any portion of the link rods 120, 130 along their length.

In operation, movement of the link rods 120, 130 (and the piston rods 55, 75) causes movement of the power take-off rods 145, 155 which transfers power between the power take-offs 140, 150 and the link rods 120, 130 (and the piston rods 55, 75). The power take-offs 140, 150 are controlled by a controller (not shown) which varies the amount of power transferred between the power take-offs 140, 150 and the link rods 120, 130 (and the piston rods 55, 75) depending on the load on the power take-offs 140, 150 and the cycle position of the pistons in the cylinders 20, 30 to maintain operation of the engine.

Power Take-Off—4$^{th}$ Arrangement

Figure 6:
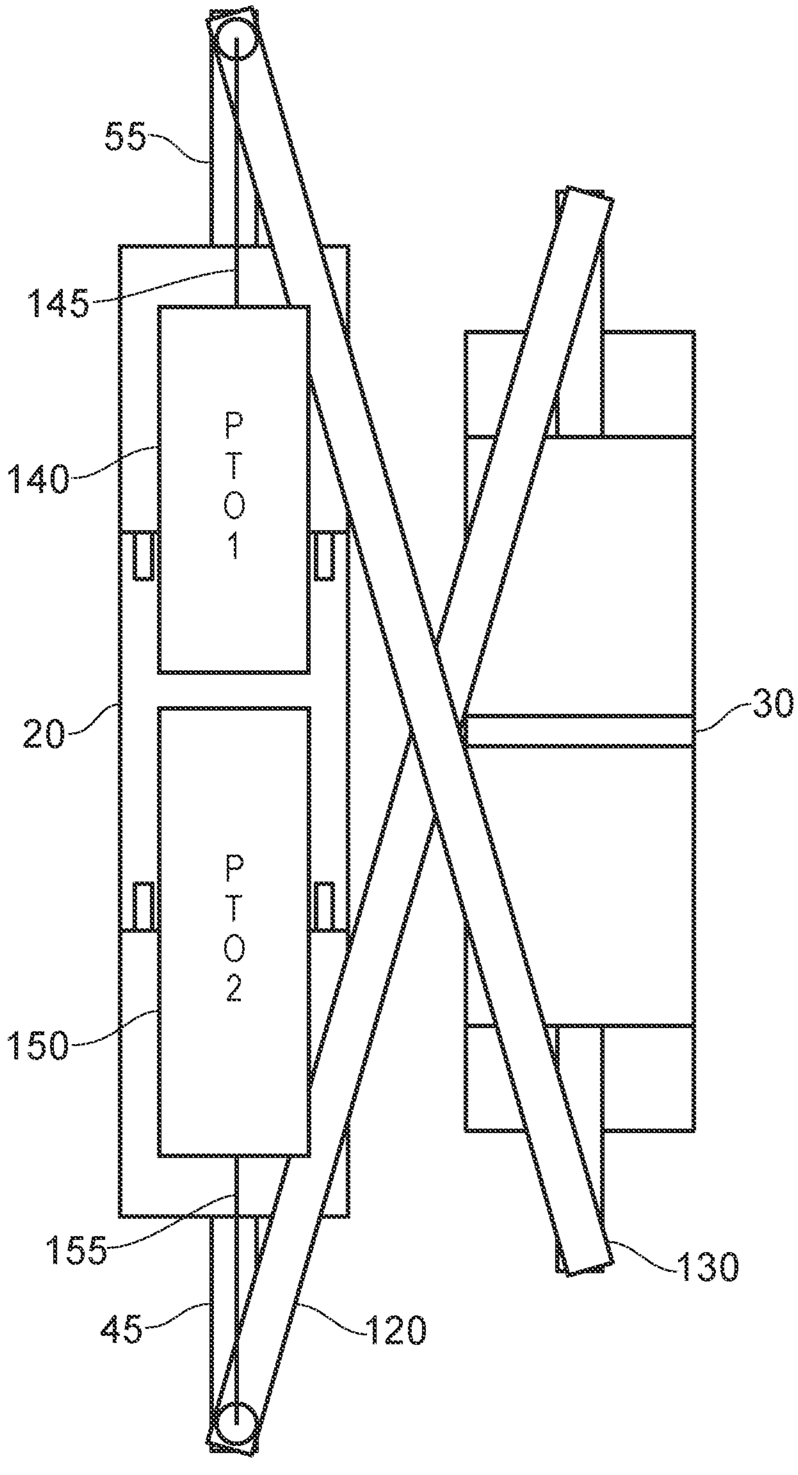

FIG. 6 illustrates schematically an alternative arrangement where the first power take-off 140 is arranged as shown in FIG. 5 but the second power take-off 150 is co-located with the first power take-off 140 to overlie the first cylinder 20. This arrangement provides a compact form factor. The first power take-off 140 and the second power take-off 150 are arranged in an opposed configuration with the second power take-off 150 being coupled with either the first link rod 120 or the first piston rod 45. Also, it can be seen that power take-off rods 145, 155 are coaxially aligned with the piston rods 45, 55. This helps to reduce unbalanced couples. The power take-off rods 145, 155 and the piston rods 45, 55 are coaxially aligned with the second power take-off 150 opposed to the first power take-off 140 which improves balance. Also, although the power take-offs 140, 150 are coupled with the ends of the link rods 120, 130, it will be appreciated that this need not be the case and that they may be coupled with any portion of the link rods 120, 130 along their length.

In operation, movement of the link rods 120, 130 (and the piston rods 45, 55) causes movement of the power take-off rods 145, 155 which transfers power between the power take-offs 140, 150 and the link rods 120, 130 (and the piston rods 45, 55). The power take-offs 140, 150 are controlled by a controller (not shown) which varies the amount of power transferred between the power take-offs 140, 150 and the link rods 120, 130 (and the piston rods 45, 55) depending on the load on the power take-offs 140, 150 and the cycle position of the pistons in the cylinders 20, 30 to maintain operation of the engine.

Power Take-Off—5$^{th}$ Arrangement

Figure 7:
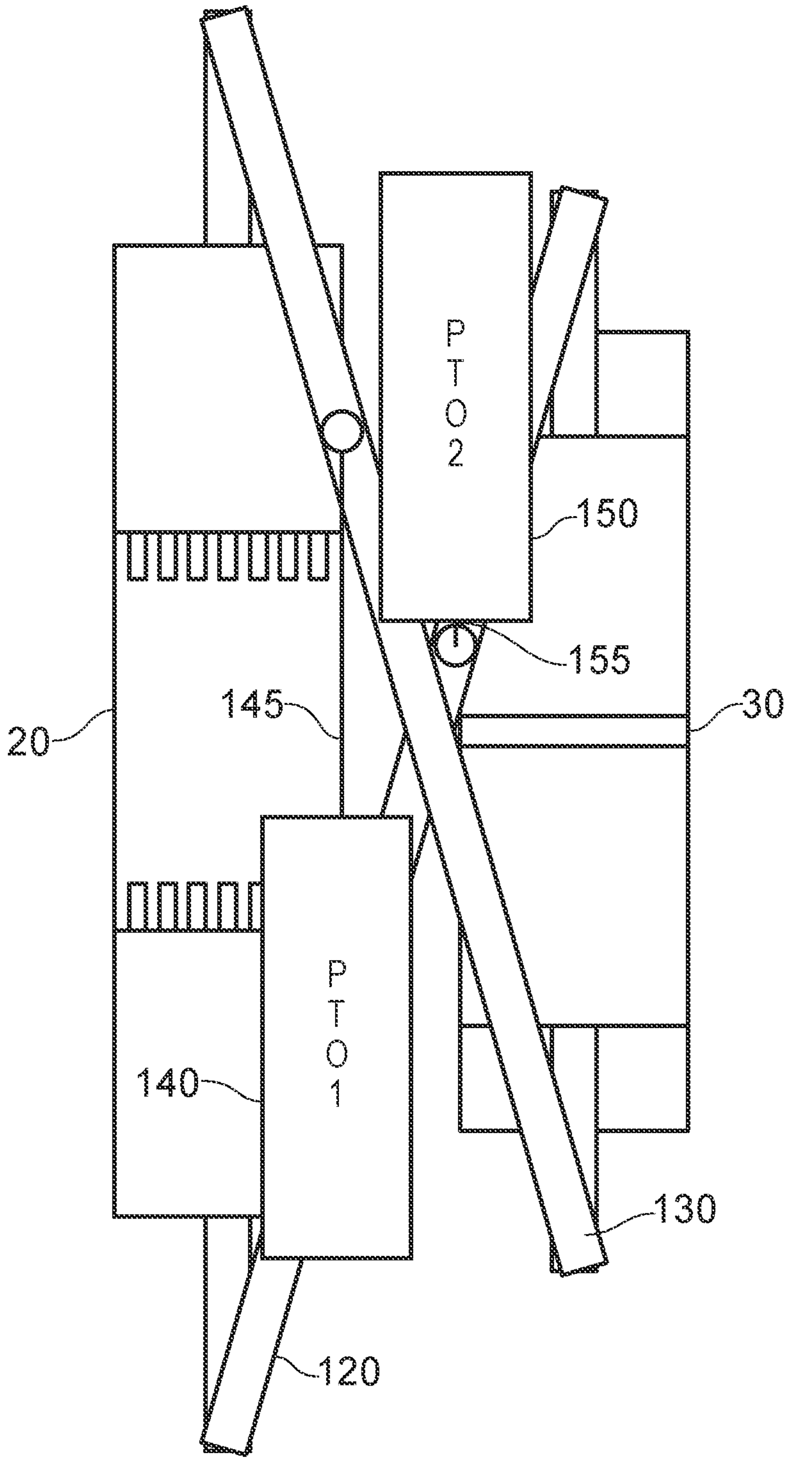

FIG. 7 illustrates schematically an alternative arrangement which is similar to that shown in FIG. 6, with the first power take-off 140 and the second power take-off 150 being arranged in an opposed configuration. However, the first power take-off 140 couples along the length of the second link rod 130 while the second power take-off 150 is coupled along the length of the first link rod 120. Both the first power take-off 140 and the second power take-off 150 overlie the cylinders 20, 30 and are located towards a space between the cylinders 20, 30. This arrangement provides a compact form factor.

In operation, movement of the link rods 120, 130 causes movement of the power take-off rods 145, 155 which transfers power between the power take-offs 140, 150 and the link rods 120, 130. The power take-offs 140, 150 are controlled by a controller (not shown) which varies the amount of power transferred between the power take-offs 140, 150 and the link rods 120, 130 depending on the load on the power take-offs 140, 150 and the cycle position of the pistons in the cylinders 20, 30 to maintain operation of the engine.

Power Take-Off—6$^{th}$ Arrangement

Figure 8:
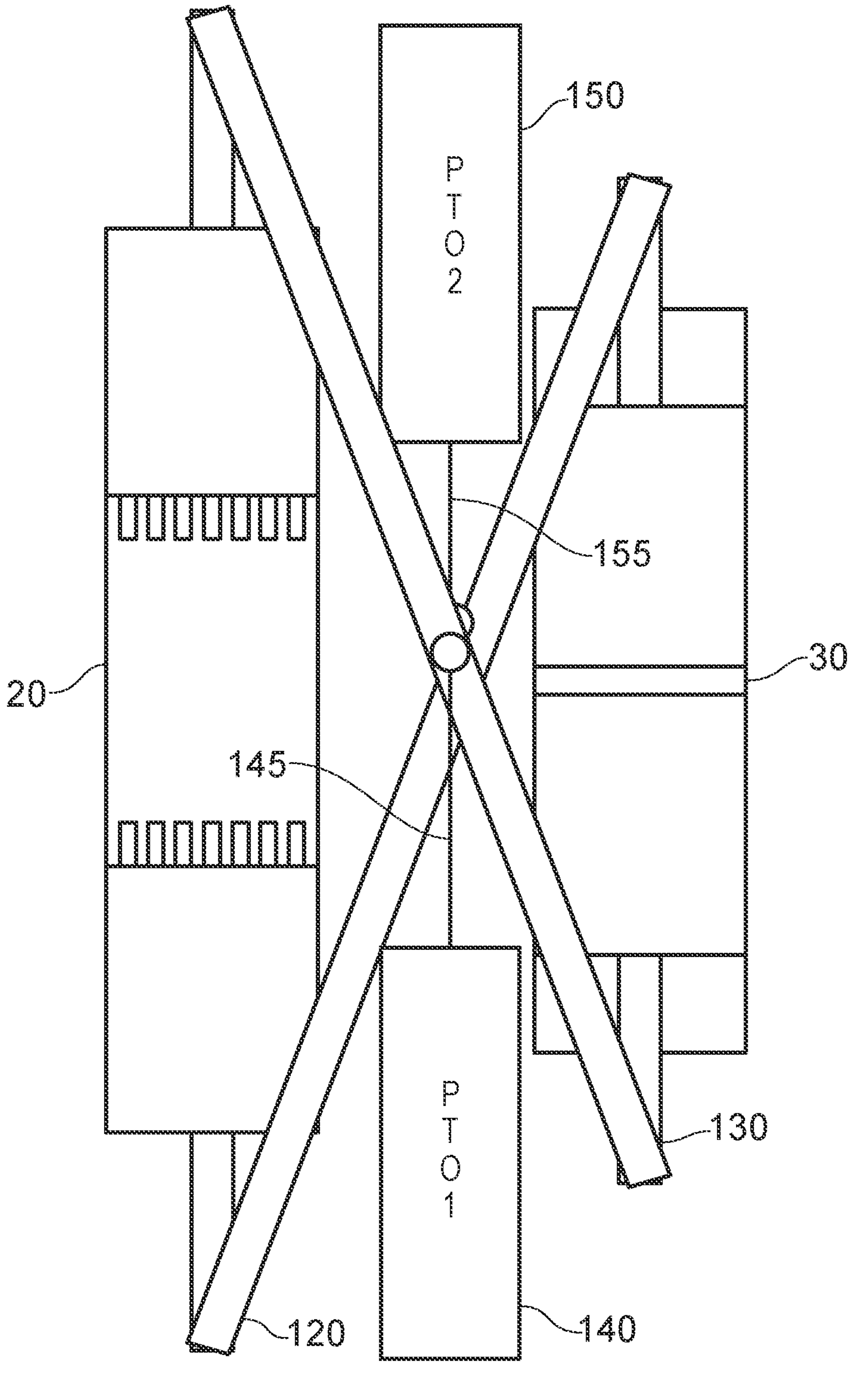

FIG. 8 shows schematically an alternative arrangement. This arrangement is similar to that shown in FIG. 7 but the distance between the centre lines of the first cylinder 20 and the second cylinder 30 is larger compared to that of FIG. 7, which provides greater space between the two cylinders 20, 30 within which the opposed first power take-off 140 and second power take-off 150 can be co-located. In this example, the first power take-off 140 and the second power take-off 150 are coaxially aligned which helps improve balance. This arrangement provides a compact form factor.

In operation, movement of the link rods 120, 130 causes movement of the power take-off rods 145, 155 which transfers power between the power take-offs 140, 150 and the link rods 120, 130. The power take-offs 140, 150 are controlled by a controller (not shown) which varies the amount of power transferred between the power take-offs 140, 150 and the link rods 120, 130 depending on the load on the power take-offs 140, 150 and the cycle position of the pistons in the cylinders 20, 30 to maintain operation of the engine.

Power Take-Off—7$^{th}$ Arrangement

Figure 9:
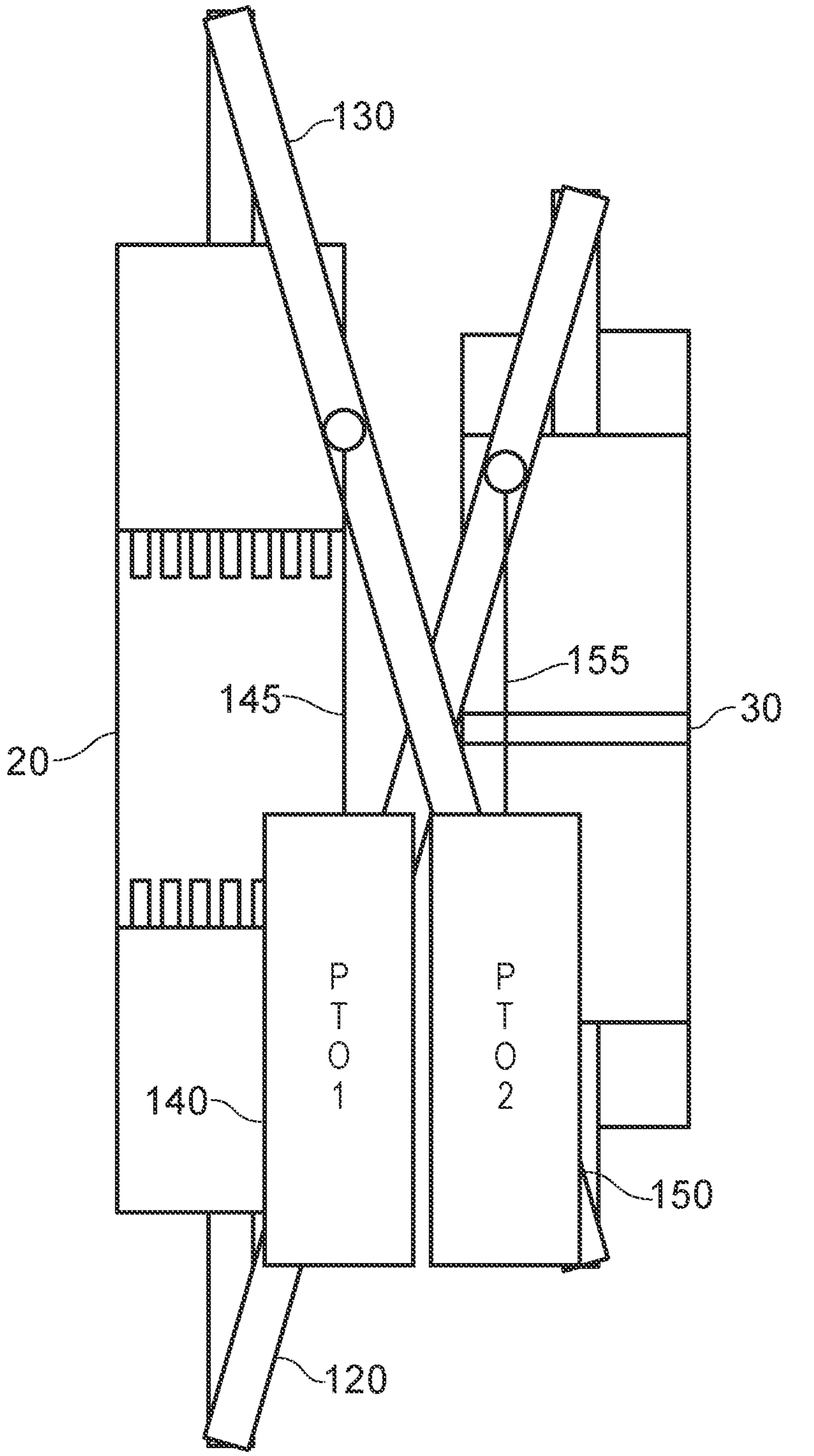

FIG. 9 shows schematically an alternative arrangement. This arrangement is similar to that shown in FIG. 7 but the first power take-off 140 and second power take-off 150 are no longer opposed. Instead, the first power take-off 140 and the second power take-off 150 are both located towards the same end of the first cylinder 20 and the second cylinder 30. Both the first power take-off 140 and the second power take-off 150 overlie the cylinders 20, 30 and are located towards a space between the cylinders 20, 30. This arrangement provides a compact form factor.

In operation, movement of the link rods 120, 130 causes movement of the power take-off rods 145, 155 which transfers power between the power take-offs 140, 150 and the link rods 120, 130. The power take-offs 140, 150 are controlled by a controller (not shown) which varies the amount of power transferred between the power take-offs 140, 150 and the link rods 120, 130 depending on the load on the power take-offs 140, 150 and the cycle position of the pistons in the cylinders 20, 30 to maintain operation of the engine.

Power Take-Off—8$^{th}$ Arrangement

Figure 10A:
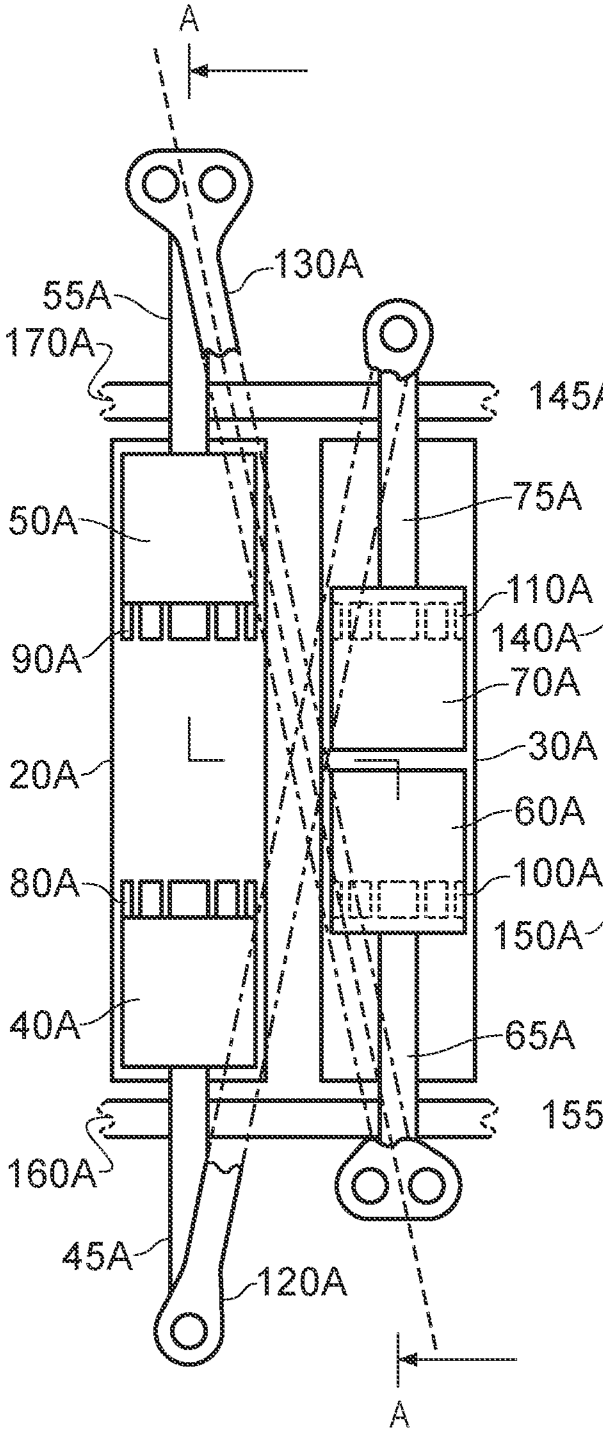
Figure 10B:
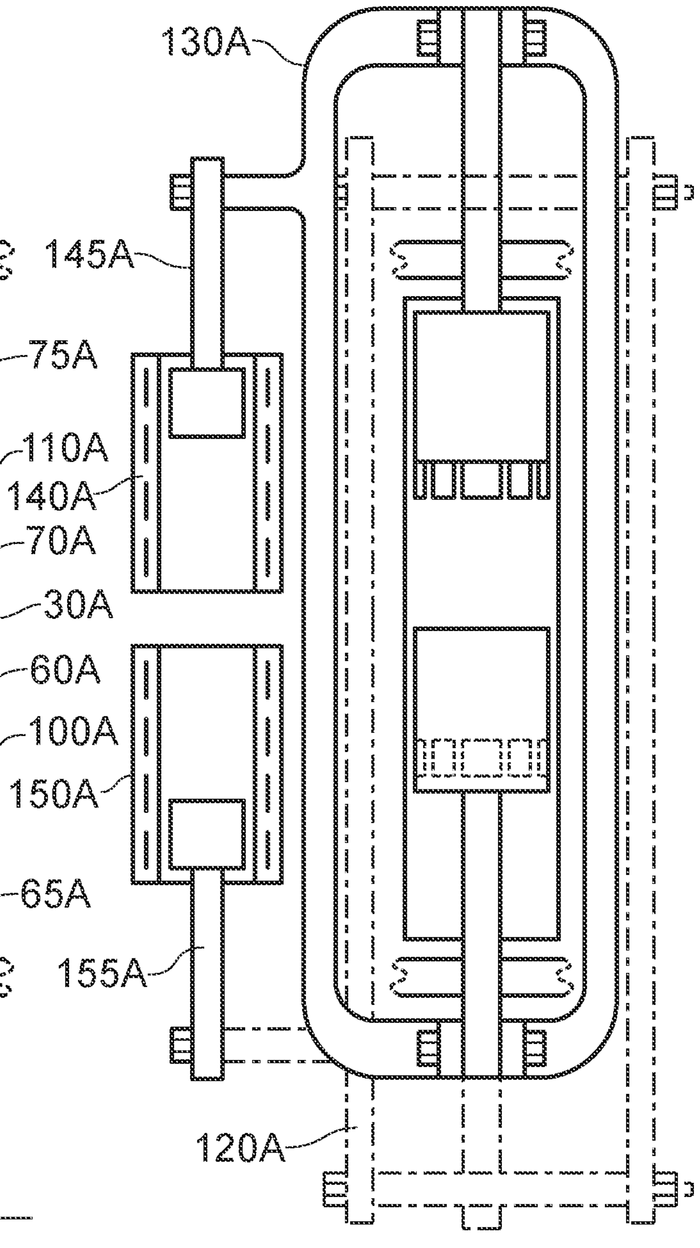
Figure 10C:
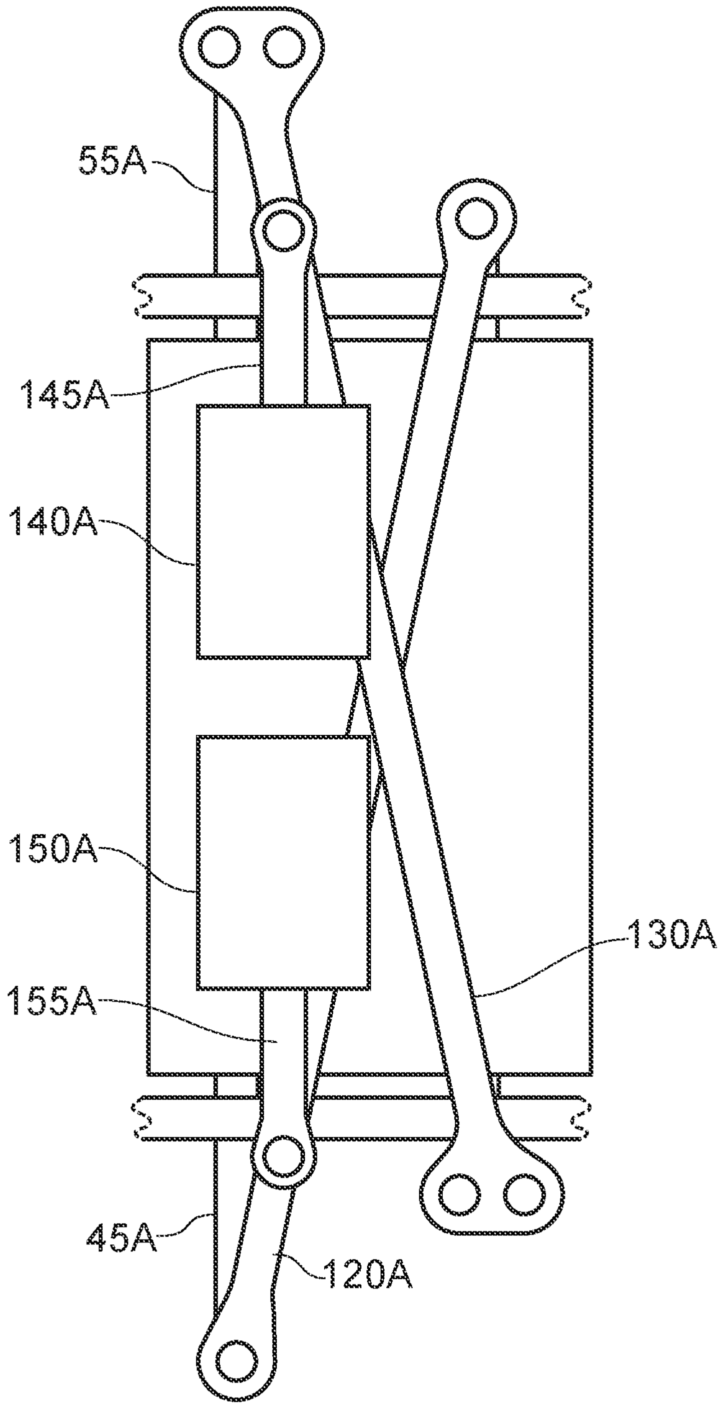

FIGS. 10A to 10C illustrate another arrangement. This arrangement is similar to the arrangement shown in FIG. 6 but with the power take-offs 140A, 150A coupled along the length of the first link rod 120A and the second link rod 130A. FIG. 10A shows a partial underside view, FIG. 10B shows a partial sectional view along the line A-A and FIG. 10C shows a top view. As can be seen, there is provided a first cylinder 20A and a second cylinder 30A. Located within the first cylinder 20A is a first piston 40A and a second piston 50A. Located within the second cylinder 30A is a third piston 60A and a fourth piston 70A. In this example, the engine is a two-stroke engine and so a first inlet port band 80A extends circumferentially around the first cylinder 20A proximate the first piston 40A, and a first outlet port band 90A extends circumferentially around the first cylinder 20A proximate the second piston 50A. Likewise, a second inlet port band 100A extends circumferentially around the second cylinder 30A proximate the third piston 60A and a second outlet port band 110A extends circumferentially around the second cylinder 30A proximate the fourth piston 70A. A first piston rod 45A extends from the first piston 40A. A second piston rod 55A extends from the second piston 50A. A third piston rod 65A extends from the first piston 60A. A fourth piston rod 75A extends from the fourth piston 70A.

A first link rod 120A pivotally couples the first piston rod 45A with the fourth piston rod 75A. A second link rod 130A fixedly couples the second piston rod 55A with the third piston rod 65A. The coupling between the link rods 120A, 130A and the piston rods 45A, 55A, 65A, 75A may be fixed or pivoting.

The first piston rod 45A and the third piston point 65A extend through a first linear bearing 160A which helps prevent movement of the piston in a direction transverse to the elongate axis of the cylinders 20A, 30A. Likewise, the second piston rod 55A and the fourth piston rod 75A extend through a second linear bearing 170A.

A first power take-off 140A couples with the second link rod 130A and the second power take-off 150A couples with the first link rod 120A. This arrangement provides a compact form factor. The first power take-off 140A and the second power take-off 150A are arranged in an opposed configuration which improves balance.

In operation, movement of the link rods 120A, 130A (and the piston rods 45A, 55A) causes movement of the power take-off rods 145A, 155A which transfers power between the power take-offs 140A, 150A and the link rods 120A, 130A (and the piston rods 45A, 55A). The power take-offs 140A, 150A are controlled by a controller (not shown) which varies the amount of power transferred between the power take-offs 140A, 150A and the link rods 120A, 130A (and the piston rods 45A, 55A) depending on the load on the power take-offs 140A, 150A and the cycle position of the pistons in the cylinders 20A, 30A to maintain operation of the engine.

Power Take-Off—9$^{th}$ Arrangement

Figure 11A:
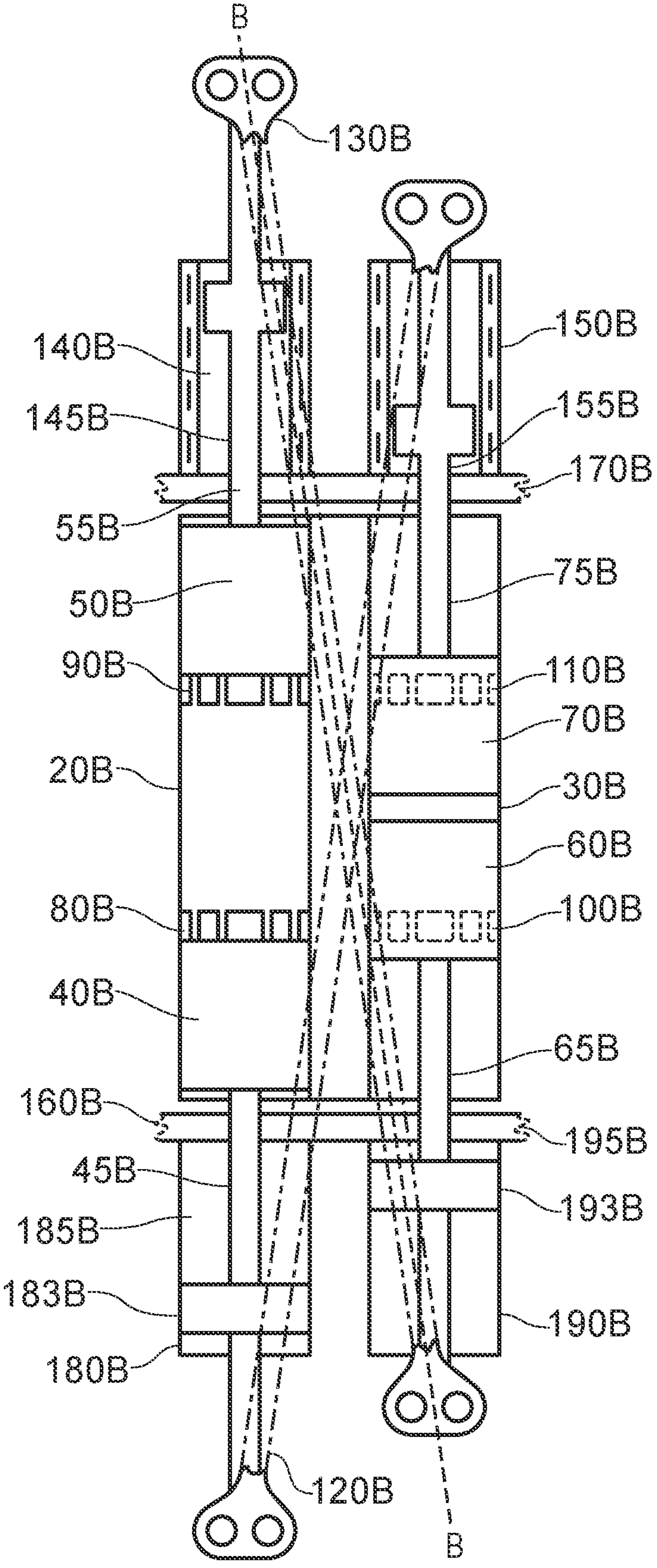
FIGS. 11A, 11B, 12A, 12B, 13A, 13B, 14A and 14B illustrate engines according to embodiments.
Figure 11B:
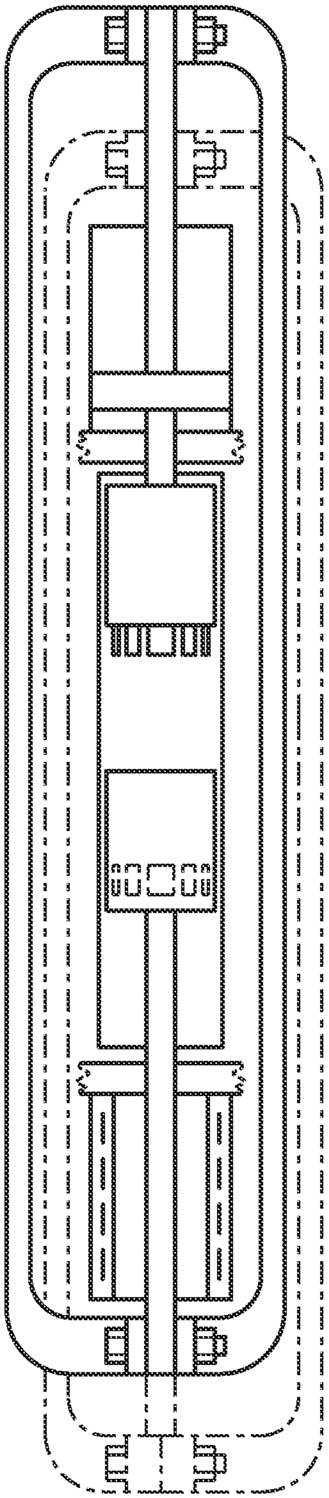

FIGS. 11A and 11B illustrate another arrangement. This arrangement is similar to the arrangement shown in FIG. 3 but with the power take-offs 140B, 150B located at the other end of the cylinders 20B, 30B. FIG. 11A shows a top view and FIG. 11B is a sectional view along the line B-B.

As can be seen, there is provided a first cylinder 20B and a second cylinder 30B. Located within the first cylinder 20B is a first piston 40B and a second piston 50B. Located within the second cylinder 30B is a third piston 60B and a fourth piston 70B. In this example, the engine is a two-stroke engine and so a first inlet port band 80B extends circumferentially around the first cylinder 20B proximate the first piston 40B, and a first outlet port band 90B extends circumferentially around the first cylinder 20B proximate the second piston 50B. Likewise, a second inlet port band 100B extends circumferentially around the second cylinder 30B proximate the third piston 60B and a second outlet port band 110B extends circumferentially around the second cylinder 30B proximate the fourth piston 70B. A first piston rod 45B extends from the first piston 40B. A second piston rod 55B extends from the second piston 50B. A third piston rod 65B extends from the first piston 60B. A fourth piston rod 75B extends from the fourth piston 70B.

A first link rod 120B fixedly couples the first piston rod 45B with the fourth piston rod 75B. A second link rod 130B fixedly couples the second piston rod 55B with the third piston rod 65B. The coupling between the link rods 120B, 130B and the piston rods 45B, 55B, 65B, 75B may be fixed or pivoting.

The first piston rod 45B and the third piston point 65B extend through a first linear bearing 160B which helps prevent movement of the pistons in a direction transverse to the elongate axis of the cylinders 20B, 30B. Likewise, the second piston rod 55B and the fourth piston rod 75B extend through a second linear bearing 170B.

A first power take-off 140B couples with the second link rod 130B and the second power take-off 150B couples with the first link rod 120B. The second piston rod 55B also provides the power take-off rod 145B and the fourth piston rod 75B provides the power take-off rod 155B.

A first chamber 180B is coupled with the first piston rod 45B and separated from a second chamber 185B by a piston 183B. A third chamber 190B is coupled with the third piston rod 65B and separated from a fourth chamber 195B by a piston 193B. Using appropriate valving, the first chamber 180B, the second chamber 185B, the third chamber 190B and the fourth chamber 195B can be configured as either bounce or pumping chambers. For example, this valving would open to allow air to flow out during the first part of the inward stroke to scavenge the cylinder, then close part-way to the other end of the travel allowing compression and bounce of any residual gases. In this arrangement, the first chamber 180B and the third chamber 190B are configured as bounce chambers which provide balance for the power take-offs 140B, 150B.

In operation, movement of the link rods 120B, 130B (and the piston rods 55B, 75B) causes movement of the power take-off rods 145B, 155B which transfers power between the power take-offs 140B, 150B and the link rods 120B, 130B (and the piston rods 55B, 75B). The power take-offs 140B, 150B are controlled by a controller (not shown) which varies the amount of power transferred between the power take-offs 140B, 150B and the link rods 120B, 130B (and the piston rods 55B, 75B) depending on the load on the power take-offs gob, 150B and the cycle position of the pistons in the cylinders 20B, 30B to maintain operation of the engine.

Power Take-Off—10$^{th}$ Arrangement

Figure 12A:
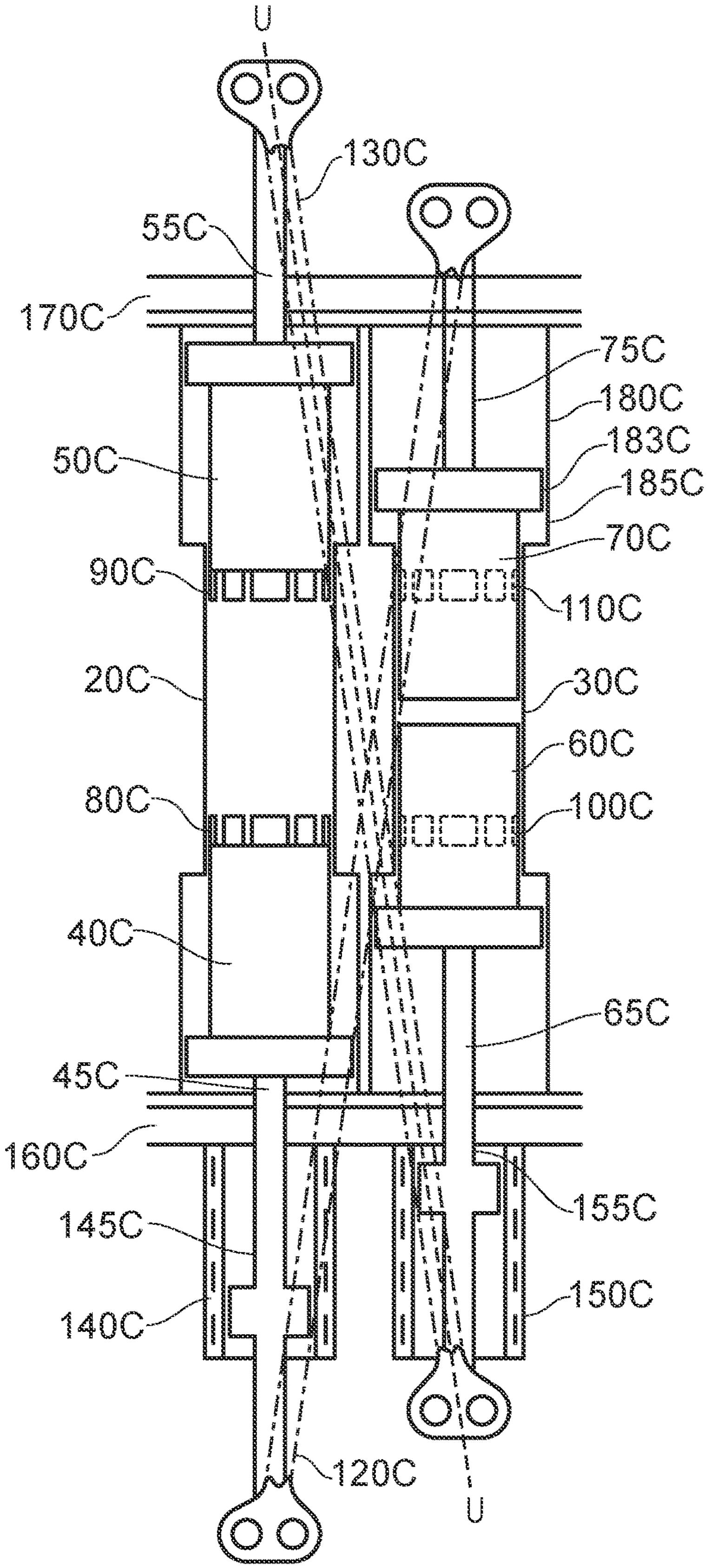
Figure 12B:
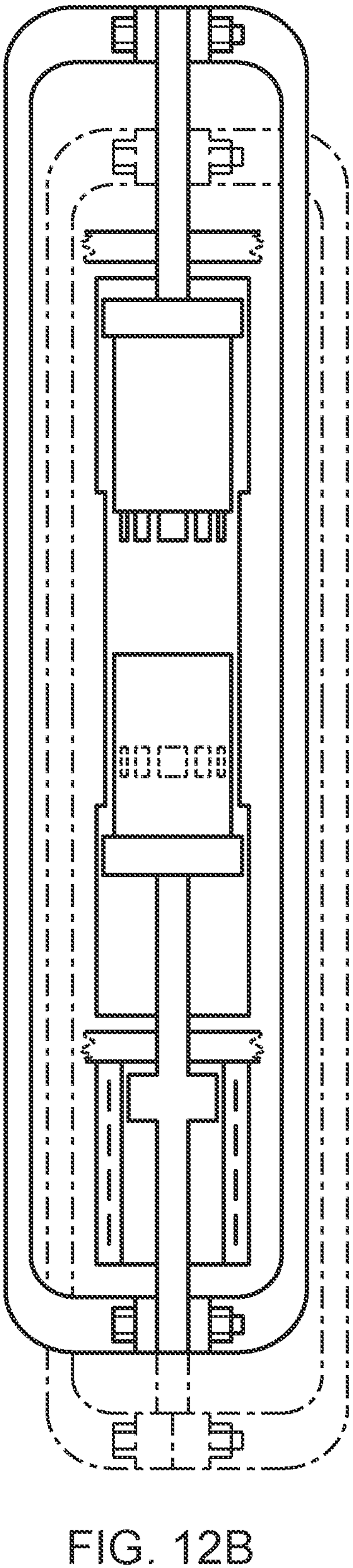

FIGS. 12A and 12B illustrate another arrangement. This arrangement is similar to the arrangement shown in FIG. 3 has stepped pistons and cylinders. FIG. 12A shows a top view, while FIG. 12B shows a sectional view along the line C-C.

As can be seen, there is provided a first stepped cylinder 20C and a second stepped cylinder 30C. Located within the first stepped cylinder 20C is a first stepped piston 40C and a second stepped piston 50C. Located within the second stepped cylinder 30C is a third stepped piston 60C and a fourth stepped piston 70B. In this example, the engine is a two-stroke engine and so a first inlet port band 80C extends circumferentially around the first stepped cylinder 20C proximate the first stepped piston 40C, and a first outlet port band 90C extends circumferentially around the first stepped cylinder 20C proximate the second stepped piston 50C. Likewise, a second inlet port band 100C extends circumferentially around the second stepped cylinder 30C proximate the third stepped piston 60C and a second outlet port band 110C extends circumferentially around the second stepped cylinder 30C proximate the fourth stepped piston 70C. A first piston rod 45C extends from the first stepped piston 40C. A second piston rod 55C extends from the second stepped piston 50C. A third piston rod 65C extends from the first stepped piston 60C. A fourth piston rod 75C extends from the fourth stepped piston 70C.

Each stepped cylinder 20C, 30C and stepped piston 40C, 50C, 60C, 70C, using appropriate valving, can be configured as either bounce or pumping chambers in a similar manner to that described above. For example, a first chamber 180C is separated from a second chamber 185C by a piston portion 183C. In this arrangement, the first chamber 180C is configured as a bounce chamber and the second chamber 185C is configured as a pumping chamber which provides compressed gases to the inlet port band. The remaining stepped cylinders and stepped pistons are configured likewise.

A first link rod 120C fixedly couples the first piston rod 45C with the fourth piston rod 75C. A second link rod 130C fixedly couples the second piston rod 55C with the third piston rod 65C. The coupling between the link rods 120C, 130C and the piston rods 45C, 55C, 65C, 75C may be fixed or pivoting.

The first piston rod 45C and the third piston point 65C extend through a first linear bearing 160C which helps prevent movement of the pistons in a direction transverse to the elongate axis of the cylinders 20C, 30C. Likewise, the second piston rod 55C and the fourth piston rod 75C extend through a second linear bearing 170C.

A first power take-off 140C couples with the first link rod 120C and the second power take-off 150C couples with the second link rod 130C. The first piston rod 45C also provides the power take-off rod 145B and the third piston rod 65C provides the power take-off rod 155C.

In operation, movement of the link rods 120C, 130C (and the piston rods 45C, 65C) causes movement of the power take-off rods 145C, 155C which transfers power between the power take-offs 140C, 150C and the link rods 120C, 130C (and the piston rods 45C, 65C). The power take-offs 140C, 150C are controlled by a controller (not shown) which varies the amount of power transferred between the power take-offs 140C, 150C and the link rods 120C, 130C (and the piston rods 45C, 65C) depending on the load on the power take-offs 140C, 150C and the cycle position of the pistons in the cylinders 20C, 30C to maintain operation of the engine.

Power Take-Off—11$^{th}$ Arrangement

Figure 13A:
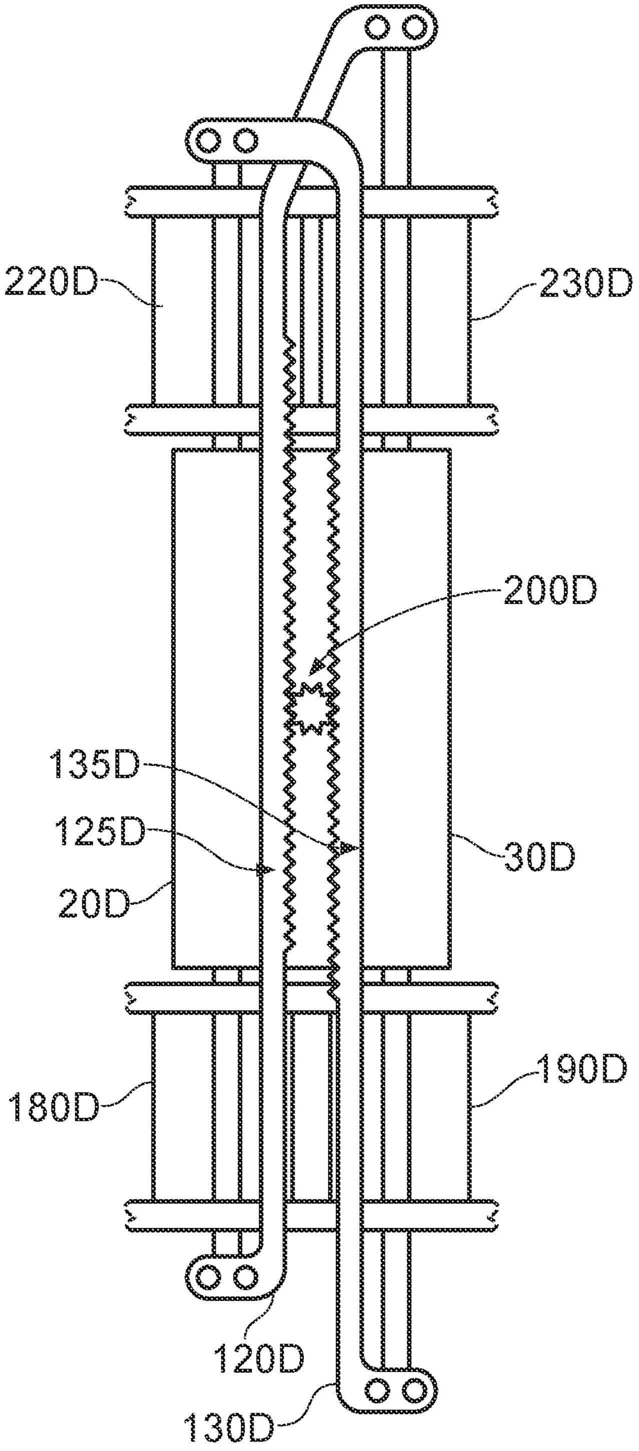

FIG. 13A shows an alternative arrangement. This arrangement is similar to FIG. 11A but has bounce chambers 180D, 190D, 220D, 230D coupled with the cylinders 20D, 30D.

In this arrangement, the first link rod 120D and the second link rod 130D are shaped to have an elongate, toothed linear portion 125D, 135D. The first link rod 120D and the second link rod 130D are shaped and located such that the toothed linear portions 125D, 135D reciprocate parallel to each other at a fixed distance apart. A pinion gear 200D of the power take-off meshes with the toothed linear portion 125D, 135D.

In operation, movement of the first link rod 120D with respect to the second link rod 130D causes movement of the toothed linear portion 125D, 135D, which in turn rotate and counter-rotate the pinion gear 200D in order to provide power to a power take-off (not shown).

Power Take-Off—12$^{th}$ Arrangement

Figure 13B:
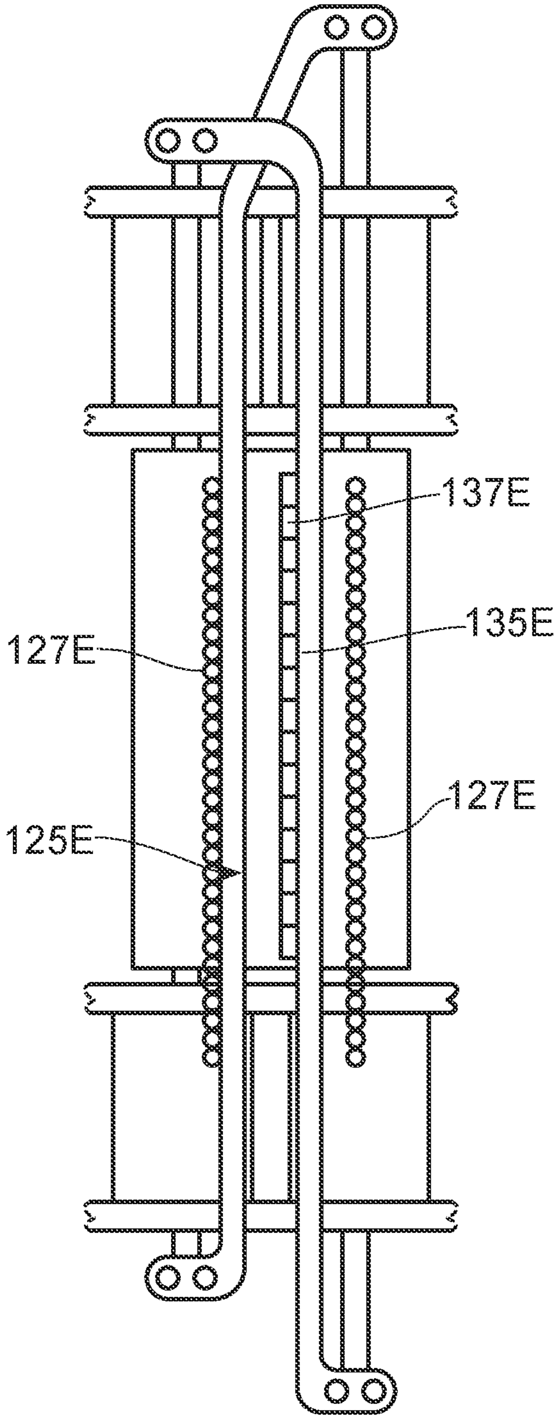

FIG. 13B shows an alternative arrangement. This arrangement is similar to FIG. 13A but has a linear motor power take-off 140E.

In this arrangement, the first link rod 120E and the second link rod 130E are shaped to have an elongate, linear portion 125E, 135E. The first link rod 120D and the second link rod 130E are shaped and located such that the linear portions 125E, 135E reciprocate parallel to each other at a fixed distance apart. In this example the linear portion 135E carries magnets 137E and the linear portion 125E carries a coil 127E (shown in cross section). It will be appreciated that other arrangements of the linear motor power take-off 140F are possible.

In operation, movement of the first link rod 120E with respect to the second link rod 130E causes movement of the linear portion 125E, 135E, which moves the magnets 137E with respect to the coil 127E in order to provide power to the power take-off 140E.

Power Take-Off—13$^{th}$ Arrangement

Figure 14A:
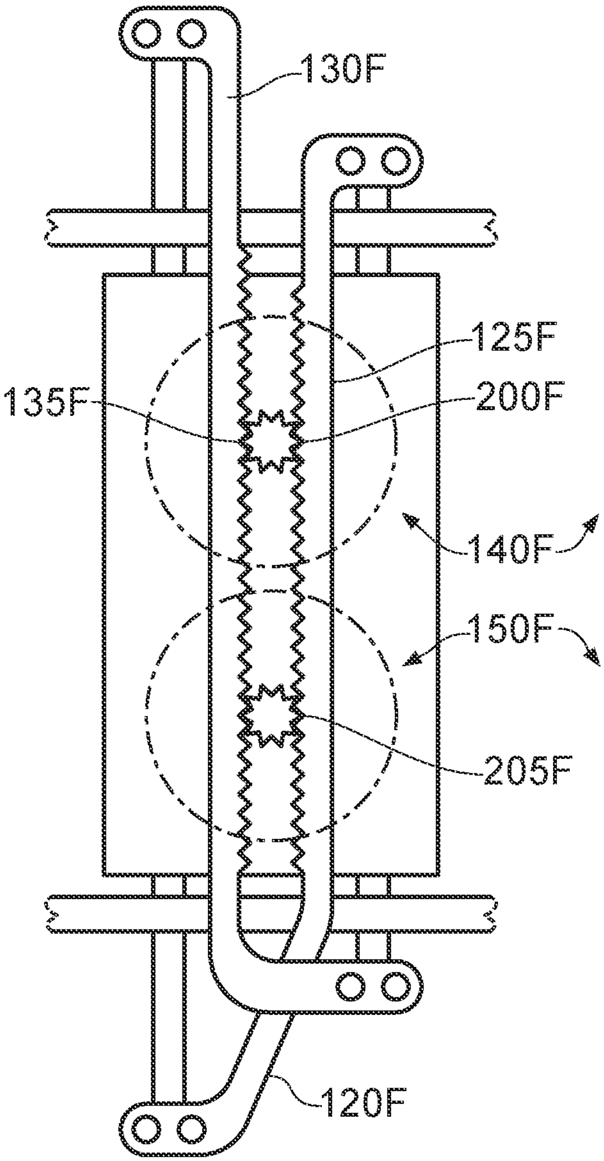
Figure 14B:
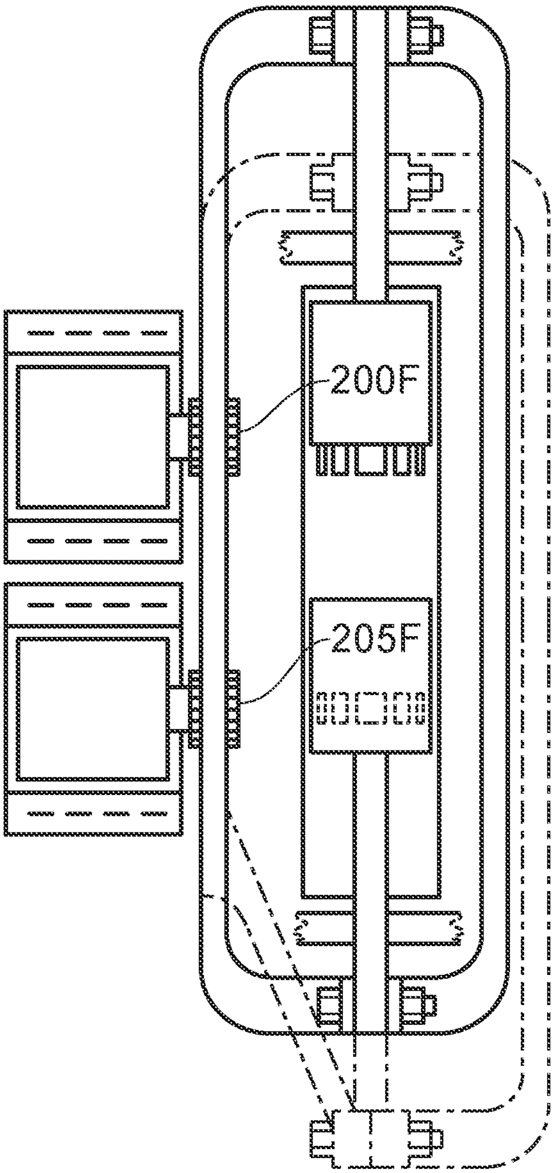

FIGS. 14A and 14B show another arrangement. FIG. 14A is a top view and FIG. 14B is a side view. This arrangement is similar to FIG. 13A but has a pair of power take-offs 140F, 150F.

In this arrangement, the first link rod 120F and the second link rod 130F are shaped to have an elongate, toothed linear portion 125F, 135F. The first link rod 120F and the second link rod 130F are shaped and located such that the toothed linear portions 125F, 135F reciprocate parallel to each other at a fixed distance apart. A pair of pinion gears 200F, 205F of the power take-offs 140F, 150F mesh with the toothed linear portion 125F, 135F.

In operation, movement of the first link rod 120D with respect to the second link rod 130D causes movement of the toothed linear portion 125D, 135D, which in turn rotate and counter-rotate the pinion gear 200D in order to provide power to a power take-off (not shown).

In an alternative arrangement, the distance between the toothed portions 135E, 125E is set to be greater than that shown in FIG. 14A, which means that only one of the toothed linear portions 125E, 135E engages with a respective one of the pinion gears 200E, 205E. For example, the distance may be set such that the toothed linear portion 135E only engages with the pinion 200D and the toothed linear portion 125E only engages with the pinion gear 205E. This enables the first link rod 120E to move independently of the second link rod 130E.

Hence, it can be seen that the arrangements mentioned above provide a pressure-balanced opposed-free-piston engine. Such arrangements are suitable for more efficient, lighter, more compact and cheaper range extender engines for such hybrid vehicles. Such engines have: fewer subsystems than normal engines—to make vehicle installation easier; extremely good states of balance (ideally perfect)—to improve vehicle noise, vibration, and harshness; very low inertia—to aid fast starting with minimal noise, vibration, and harshness impact. These arrangements provide compactness, low mass, reduced friction through elimination of main bearings, high-pressure oil pump, and piston side thrust and potential cost saving versus a conventional engine and generator. For these arrangements, the types of power take-off (PTO) can be electric, hydraulic, or pneumatic. An electric PTO is useful due to synergy with electric hybridization. These arrangements combine the benefits of opposed piston construction with reduction in electric machines per cylinder (electric machines could be replaced by hydraulic or pneumatic power take-offs). The power for compression is directly taken from the expansion process, there is a 180 degree firing interval, there is a minimized power requirement for electric machines, variable top and bottom dead centres would still control gas exchange and compression ratio, there is excellent balance. The piston cross link rods are only ever in tension (except for initial starting) which provides an opportunity for carbon fibre, or similar lightweight tensile material or composite to be used for weight reduction. Power take-off is typically from each mover (piston), it can be from one of the two pistons in the mover assembly or anywhere along the length of the piston links. While the power take-off rods alternate between compression and tension, the cross link rods are always in tension. The power take-offs can be placed alongside or around the cylinders to reduce package volume which mitigates the length problem of traditional arrangements and bounce or pumping chambers can also be configured in. The power take-offs only have to deal with the net power output. The power take-off could be via rocking beam/conrods with a single oscillating generator. The gas loads in the different chambers may mitigate the 2-stroke big end problem. The fulcrum of this could be moved to help to change top dead centre/bottom dead centre positions. The introduction of bounce and/or pumping chambers may introduce some compression loads in the cross links due to different pressures in the chambers.

Embodiments provide a twin-cylinder (in its simplest form) opposed-free-piston engine in which the upper and lower cylinders of opposite cylinders are linked by a cross link. This means that one cylinder moves to top dead centre (minimum volume) as the other moves to bottom dead centre (maximum volume). The two piston assemblies (or movers) move in opposite directions, providing very good balance. Compression work in one cylinder is directly removed from the expansion work in the other, with no inefficiencies were, for instance, electrical power needed to transfer the work between the two. Top and bottom dead centres can be varied due to the arrangement being a free-piston engine, and so compression ratio can be altered during operation. Each piston mover is attached to a power take-off, which can be electric, hydraulic, or pneumatic. Similarly, bounce chambers and/or pumping chambers can be attached to the movers. The engine operates preferably on the 2-stroke cycle (although 4—and more stroke operation would be possible with the appropriate valving arrangement). The use of the opposed-piston configuration ensures good fuel economy. Once the engine is started, the cross-links are only ever in tension. As such they can be very slender and could be made from carbon fibre for instance. The cylinders can have the intake and exhaust ports at the same or opposite ends; there are potential benefits to both.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. An opposed, free-piston engine, comprising:

a pair of adjacent cylinders each extending from a first cylinder end to a second cylinder end along an elongate axis and comprising, a first cylinder housing a first pair of opposed, free pistons comprising a first piston housed towards said first cylinder end and a second piston housed towards said second cylinder end; and a second cylinder housing a second pair of opposed, free pistons comprising a third piston housed towards said first end cylinder and a fourth piston housed towards said second cylinder end; and a pair of link rods comprising a first link rod and a second link rod, said first link rod having a first link rod end and a second link rod end, said first link rod being coupled, at said first link rod end, with said first piston and being coupled, at said second link rod end, only with said fourth piston, and said second link rod having a third link rod end and a fourth link rod end, said second link rod being coupled, at said third link rod end, with said second piston and being coupled, at said fourth link rod end, only with said third piston.

2. The engine of claim 1, wherein at least one of movement of one of said first piston and said fourth piston along said elongate axis moves said first link rod to move another of said fourth piston and said first piston along said elongate axis and movement of one of said second piston and said third piston along said elongate axis moves said second link rod to move another of said third piston and said second piston along said elongate axis.

3. The engine of claim 1, comprising a pair of power take-offs comprising a first power take-off coupled with said first link rod and a second power take-off coupled with said second link rod.

4. The engine of claim 3, wherein at least one of said first power take-off and said second power take-off are positioned towards at least one of said first cylinder end and said second cylinder end.

5. The engine of claim 3, wherein at least one of said first power take-off and said second power take-off are positioned to at least partially overlie at least one of said first cylinder and said second cylinder.

6. The engine of claim 3, wherein said pistons each comprise a piston rod and said power take-offs each comprise a take-off rod and wherein an elongate axis of said piston rods are coaxially aligned with an elongate axis of said take-off rods.

7. The engine of claim 6, wherein said first power take-off is coupled with one of said piston rod of said first piston and said piston rod of said fourth piston and said second power take-off is coupled with one of said piston rod of said second piston and said piston rod of said third piston.

8. The engine of claim 3, wherein said first power take-off is coupled with one of said first end of said first link rod and said second end of said first link rod and said second power take-off is coupled with one of a third end of said second link rod and said fourth end of said first second rod.

9. The engine of claim 3, wherein said first power take-off is coupled at a first position along said first link rod and said second power take-off is coupled at a second position along said second link rod.

10. The engine of claim 3, wherein said first power take-off and second power take-off are positioned at least partially between said first cylinder and said second cylinder.

11. The engine of claim 3, wherein said first power take-off and second power take-off are at least one of offset either side of a centreline extending between said first cylinder and said second cylinder, along said elongate axis and coaxially aligned on a centreline extending between said first cylinder and said second cylinder, along said elongate axis.

12. The engine of claim 3, wherein said first power take-off and said second power take-off are opposed.

13. The engine of claim 12, comprising at least one of a bounce chamber and a pumping chamber coupled with at least one of at least one of said pistons and at least one of said link rods.

14. The engine of claim 13, wherein at least one cylinder and piston is stepped to provide said at least one of said bounce chamber and said pumping chamber.

15. The engine of claim 13, comprising at least one of a first conduit arranged to couple said pumping chamber of one of said first cylinder and said second cylinder with said inlet of another of said second cylinder and said first cylinder and a second conduit arranged to couple said pumping chamber of one of said first cylinder and said second cylinder with said inlet of said one of said first cylinder and said second cylinder.

16. The engine of claim 3, wherein at least one of said first link rod and said second link rod is arranged to present an elongate portion and at least one of said power take-offs is coupled with said elongate portion.

17. The engine of claim 3, wherein at least one of said first link rod and said second link rod are arranged to present a pair of parallel, counter-reciprocating, elongate portions and at least one of said power take-offs is coupled with at least one of said pair of parallel, counter-reciprocating, elongate portions.

18. The engine of claim 17, wherein said pair of parallel, counter-reciprocating, elongate portions comprise gear racks and each power take-off comprises a gear driven by motion of a respective one of said gear racks.

19. The engine of claim 18, comprising a gear positioner arranged to move a position of said gear with respect to said gear racks.

20. The engine of claim 17, wherein said pair of parallel, counter-reciprocating, elongate portions comprise facing gear racks and said at least one of said power take-offs comprises a gear driven by relative motion of said facing gear racks.

21. The engine of claim 17, wherein said pair of parallel, counter-reciprocating, elongate portions comprise one of magnetic and coil components of a linear motor which are arranged to move relative to another of coil and magnetic components of said linear motor.

22. The engine of claim 3, comprising a controller arranged to control power transfer between said power take-offs and said link rods to vary at least one of cycle timing and compression of said free-piston engine.

23. The engine of claim 1, wherein said first cylinder and said second cylinder each comprise at least one inlet port located towards said first end and at least one outlet port located towards said second end.

24. The engine of claim 1, wherein said first cylinder comprises at least one inlet port located towards said first end and at least one outlet port located towards said second end and said second cylinder comprises at least one outlet port located towards said first end and at least one inlet port located towards said second end.

* * * * *